United States Patent
Yamaura

(10) Patent No.: US 10,615,706 B2
(45) Date of Patent: Apr. 7, 2020

(54) POWER CONVERSION APPARATUS AND MANUFACTURING METHOD FOR THE SAME

(71) Applicant: DENSO CORPORATION, Kariya, Aichi-pref. (JP)

(72) Inventor: Satoshi Yamaura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/304,117

(22) PCT Filed: May 15, 2017

(86) PCT No.: PCT/JP2017/018250
§ 371 (c)(1),
(2) Date: Nov. 21, 2018

(87) PCT Pub. No.: WO2017/204023
PCT Pub. Date: Nov. 30, 2017

(65) Prior Publication Data
US 2019/0356234 A1    Nov. 21, 2019

(30) Foreign Application Priority Data
May 25, 2016    (JP) ................. 2016-104559

(51) Int. Cl.
*H02M 7/48* (2007.01)
*H02M 7/00* (2006.01)
(52) U.S. Cl.
CPC ............ *H02M 7/003* (2013.01); *H02M 7/48* (2013.01)

(58) Field of Classification Search
CPC ................ H02M 7/003; H02M 7/48
See application file for complete search history.

(56) References Cited

U.S. PATENT DOCUMENTS

| | | | |
|---|---|---|---|
| 2013/0070502 A1* | 3/2013 | Suzuki | H02M 7/003 363/131 |
| 2014/0085955 A1* | 3/2014 | Maeda | H02M 7/003 363/132 |
| 2014/0153189 A1* | 6/2014 | Okamura | H05K 1/0213 361/688 |

(Continued)

FOREIGN PATENT DOCUMENTS

JP    2013-046468 A    3/2013

Primary Examiner — Alex Torres-Rivera
(74) Attorney, Agent, or Firm — Oliff PLC

(57) ABSTRACT

A power conversion apparatus includes a plurality of semiconductor modules each with a power terminal protruding therefrom, a capacitor, and a pair of bus bars. The power terminals include a pair of DC terminals electrically connected to the capacitor via the bus bars, and an AC terminal. Each of the bus bars includes terminal connection portions welded to the respective DC terminals and a common portion electrically connected to the plurality of terminal connection portions. The common portions are arranged between the sets of the plurality of power terminals. An insulation member is interposed between the pair of common portions. High-thermal-resistance portions having a higher thermal resistance than the terminal connection portions are each formed between the corresponding terminal connection portion and the corresponding common portion.

5 Claims, 19 Drawing Sheets

(56) References Cited

U.S. PATENT DOCUMENTS

2014/0369099 A1* 12/2014 Asako ................... H02M 7/003
363/97
2016/0128216 A1* 5/2016 Harada ................ H05K 7/1432
361/728

* cited by examiner

POWER CONVERSION APPARATUS AND MANUFACTURING METHOD FOR THE SAME

CROSS-REFERENCE TO RELATED APPLICATION

The present application claims priority to Japanese Patent Application No. 2016-104559 filed on May 25, 2016, the entire disclosure of which is incorporated herein by reference.

TECHNICAL FIELD

The present disclosure relates to a power conversion apparatus including a plurality of semiconductor modules, a smoothing capacitor, and a pair of bus bars connecting the semiconductor modules and the smoothing capacitor together, and a manufacturing method for the power conversion apparatus.

BACKGROUND ART

A known power conversion apparatus for power conversion between AC power and DC power includes a plurality of semiconductor modules, a smoothing capacitor, and a pair of bus bars connecting the semiconductor modules and a smoothing capacitor together (see PTL 1 listed below). Each of the semiconductor modules includes a main body portion including a built-in semiconductor device and power terminals protruding from the main body portion. The power terminals include DC terminals electrically connected to the capacitor via the bus bars and an AC terminal electrically connected to an AC load. The plurality of semiconductor modules are arrayed in a thickness direction of the power terminals.

Each of the bus bars includes terminal connection portions welded to the respective DC terminals and a common portion electrically connected to the plurality of terminal connection portions. The common portion is arranged at a position where the common portion covers the AC terminal in a protruding direction thereof.

In recent years, there has been a growing demand to miniaturize power conversion apparatuses. Every effort has thus been made to examine a configuration in which the common portions formed on the respective bus bars of the pair are arranged between the sets of the plurality of power terminals (see FIG. 19 and FIG. 20). This allows effective utilization of space between the sets of the plurality of power terminals as space where the common portion is arranged. This in turn enables a reduction in wasted space and thus in the size of the power conversion apparatus.

CITATION LIST

Patent Literature

[PTL 1] JP 2013-46468

SUMMARY OF THE INVENTION

The above-described power conversion apparatus is likely to involve difficulty in increasing an insulation level of the pair of bus bars. That is, in the power conversion apparatus, the pair of common portions is arranged between the sets of the plurality of power terminals, and thus, the common portions are likely to be close to each other. This leads to a need to interpose an insulation member between the pair of common portions to increase the insulation level of the common portions. The above-described configuration also reduces a distance from the terminal connection portions to the common portion. Welding heat resulting from welding of the terminal connection portions to the respective DC terminals is thus likely to be transferred to the common portion. The welding heat may therefore degrade the insulation member and thus the insulation between the bus bars.

An object of the present disclosure is to provide a power conversion apparatus that may be miniaturized and that enables an increase in the insulation level of a pair of bus bars, and also to provide a manufacturing method for the power conversion apparatus.

A first aspect of the present disclosure provides a power conversion apparatus including a plurality of semiconductor modules each including a main body portion with a built-in semiconductor device and a power terminal protruding from the main body portion, a capacitor smoothing a DC voltage, and a pair of bus bars, wherein the power terminals include a pair of DC terminals electrically connected to the capacitor via the bus bars and an AC terminal electrically connected to an AC load, the plurality of semiconductor modules are arrayed in a thickness direction of the power terminals, each of the bus bars includes terminal connection portions joined and welded to the respective DC terminals and a common portion electrically connected to the plurality of terminal connection portions, the common portions are arranged between the sets of the plurality of power terminals adjacent to each other in a width direction orthogonal to a protruding direction and the thickness direction of the power terminals, and an insulation member is interposed between the pair of common portions to insulate the common portions from each other, and each of the bus bars includes high-thermal-resistance portions each formed between the corresponding terminal connection portion and the corresponding common portion to electrically connect the terminal connection portion and the common portion together, the high-thermal-resistance portion offering a higher thermal resistance than the terminal connection portion.

A second aspect of the present disclosure provides a manufacturing method for the power conversion apparatus, the method including: a bus bar manufacturing step of press-working a metal plate and further folding the metal plate at areas thereof corresponding to the high-thermal-resistance portions, to manufacture the bus bars each including the terminal connection portions each with a burr protruding toward a contact surface contacting the corresponding DC terminal in the thickness direction; a contact step of bringing the contact surface of each terminal connection portion into contact with the corresponding DC terminal; and a welding step of welding the terminal connection portion to the DC terminal.

Advantageous Effects of the Invention

The above-described power conversion apparatus includes the high-thermal-resistance portion between the terminal connection portion and the common portion.

Welding heat resulting from welding of the terminal connection portion to the DC terminal is thus less likely to be transferred to the common portion. The welding heat is therefore less likely to be transferred to the insulation member, allowing degradation of the insulation member to be suppressed. This enables an increase in the insulation level of the pair of bus bars.

Furthermore, in the power conversion apparatus, the common portions formed on the respective bus bars of the pair are arranged between the sets of the plurality of power terminals. Space between the sets of the plurality of power terminals may thus be effectively utilized as space where the common portions are arranged. This enables a reduction in wasted space and thus in the size of the power conversion apparatus.

Furthermore, in the bus bar manufacturing step of the manufacturing method for the power conversion apparatus, the areas of the metal plate to form the high-thermal-resistance portions are folded. The areas to form the high-thermal-resistance portions can therefore be easily folded by, for example, reducing the width of the areas or using a less rigid material. This facilitates manufacturing of the bus bars.

In the manufacturing method for the power conversion apparatus, the bus bar manufacturing step is executed to manufacture the bus bars each including the terminal connection portions each with the burr protruding toward the contact surface contacting the corresponding DC terminal in the thickness direction. Each DC terminal is then brought into contact with the contact surface side of the corresponding terminal connection portion, that is, the side of the terminal connection portion from which the burr protrudes, and the DC terminal and the terminal connection portion are welded together.

On a side of the terminal connection portion opposite to the burr protruding side, a tip surface of the terminal connection portion is rounded (see FIG. 11). Thus, if this side is brought into contact with the DC terminal, a contact area between the DC terminal and the terminal connection portion is reduced. This hinders conduction of a high current. However, the DC terminal is brought into contact with the burr protruding side of the terminal connection portion as in the above-described manufacturing method, thus enabling an increase in the contact area between the terminal connection portion and the DC terminal. This enables conduction of a high current.

As described above, the present aspect is capable of providing the power conversion apparatus that may be miniaturized and that enables an increase in the insulation level of the pair of bus bars, and also providing the manufacturing method for the power conversion apparatus.

BRIEF DESCRIPTION OF THE DRAWINGS

The above-described object and other objects, features, and advantages of the present disclosure will be more apparent from the following detailed description taken with reference to the accompanying drawings.

DESCRIPTION OF THE EMBODIMENTS

The above-described power conversion apparatus may be an in-vehicle power conversion apparatus to be mounted in a vehicle such as a hybrid vehicle or an electric vehicle.

(First Embodiment)

Figure 1:
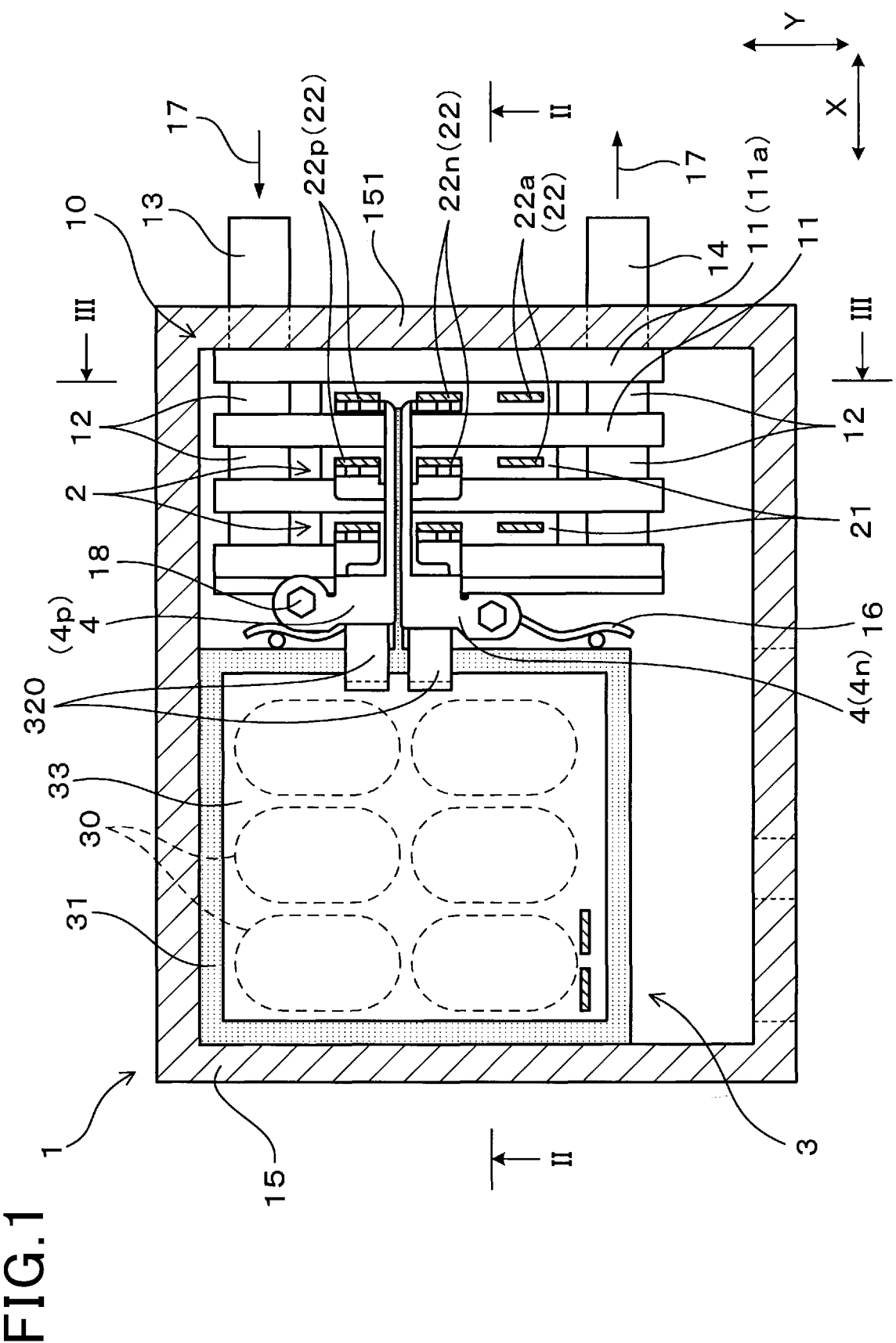
FIG. 1 is a cross-sectional view of a power conversion apparatus according to a first embodiment, taken along line I-I in FIG. 2.

Embodiments of the power conversion apparatus will be described with reference to FIGS. 1 to 15. As illustrated in FIG. 1, the power conversion apparatus according to the present embodiment includes a plurality of semiconductor modules 2, a capacitor 3, and a pair of bus bars 4 (4p, 4n). Each of the semiconductor modules 2 includes a main body portion 21 with built-in semiconductor devices 20 (see FIG. 15) and a power terminal 22 (22p, 22n, 22a) protruding from the main body portion 21. The capacitor 3 is provided to smooth a DC voltage of a DC power supply 8 (see FIG. 15).

The plurality of semiconductor modules 2 are arrayed in a thickness direction of the power terminal 22 (hereinafter also referred to as the X direction).

Figure 15:
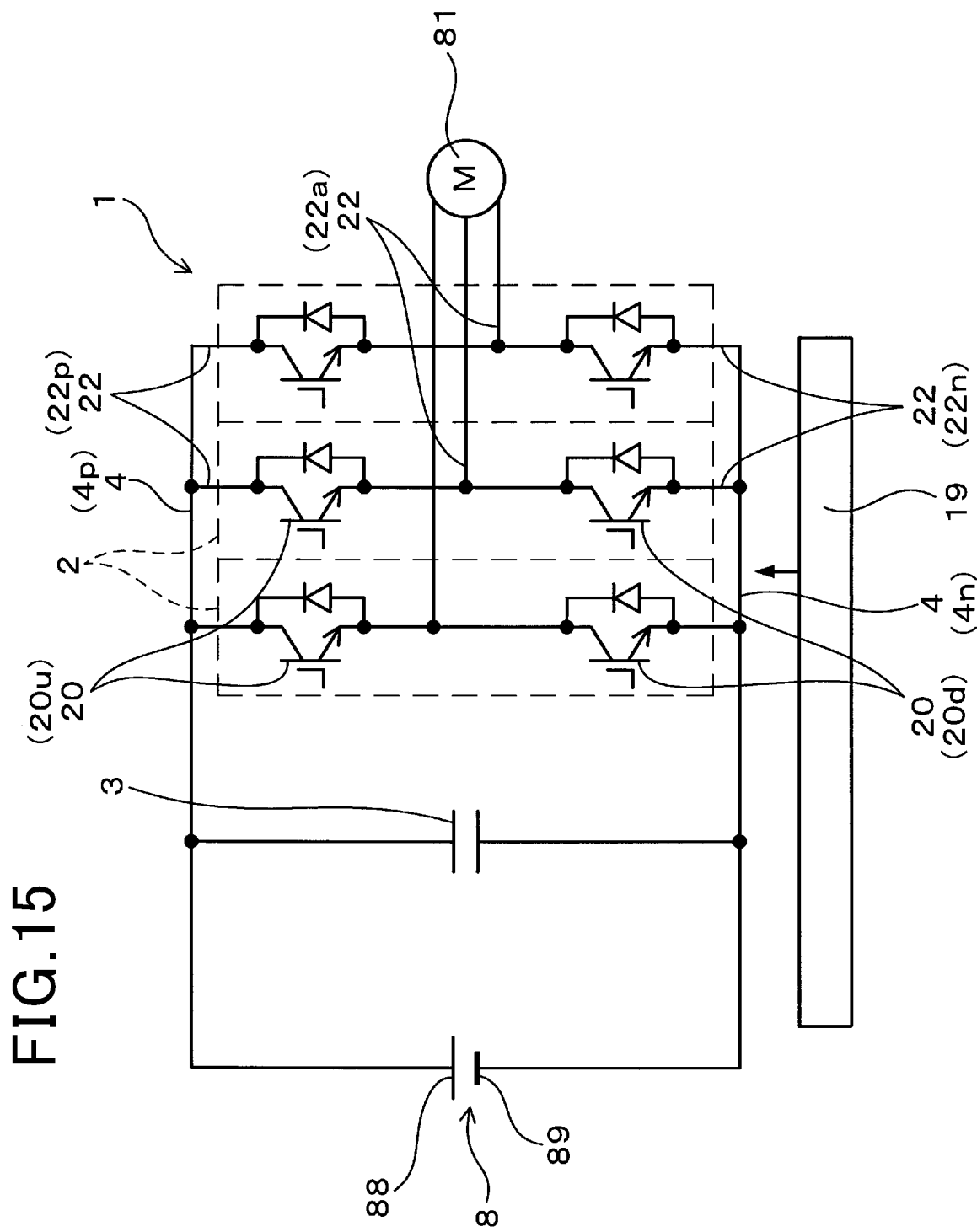
FIG. 15 is a circuit diagram of the power conversion apparatus 1 according to the first embodiment.

The power terminals 22 include a pair of DC terminals 22p, 22n connected to the capacitor 3 via the bus bars 4 and an AC terminal 22a electrically connected to an AC load 81 (see FIG. 15).

The DC terminals 22p, 22n include cathode terminals 22p electrically connected to a cathode 88 of the DC power supply 8 (see FIG. 15) via the bus bars 4 and anode terminals 22n electrically connected to an anode 89 of the DC power supply 8. Furthermore, the bus bars 4 include a cathode bus bar 4p connected to the cathode terminals 22p and an anode bus bar 4n connected to the anode terminals 22n.

Figure 3:
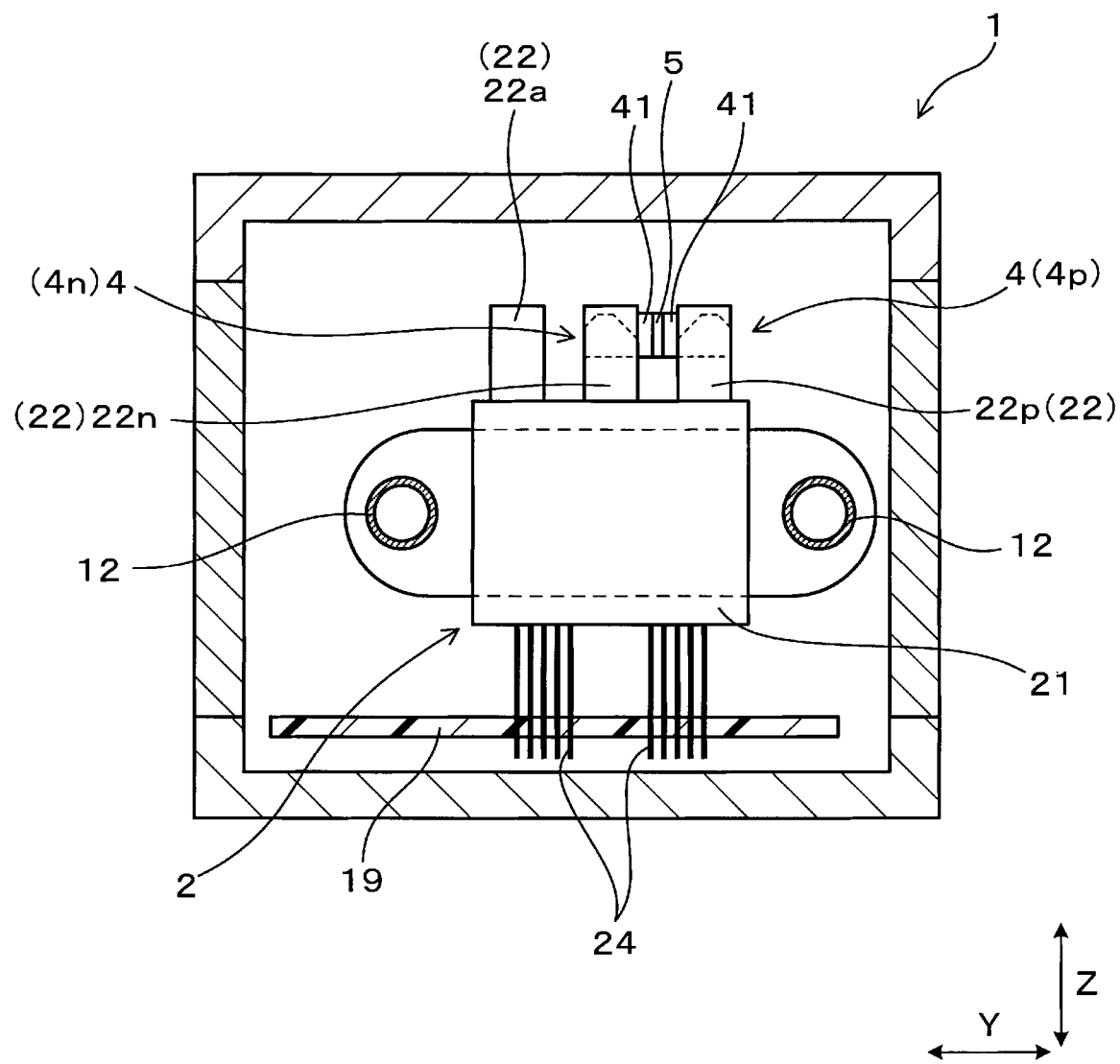
FIG. 3 is a cross-sectional view taken along line III-III in FIG. 1.
Figure 4:
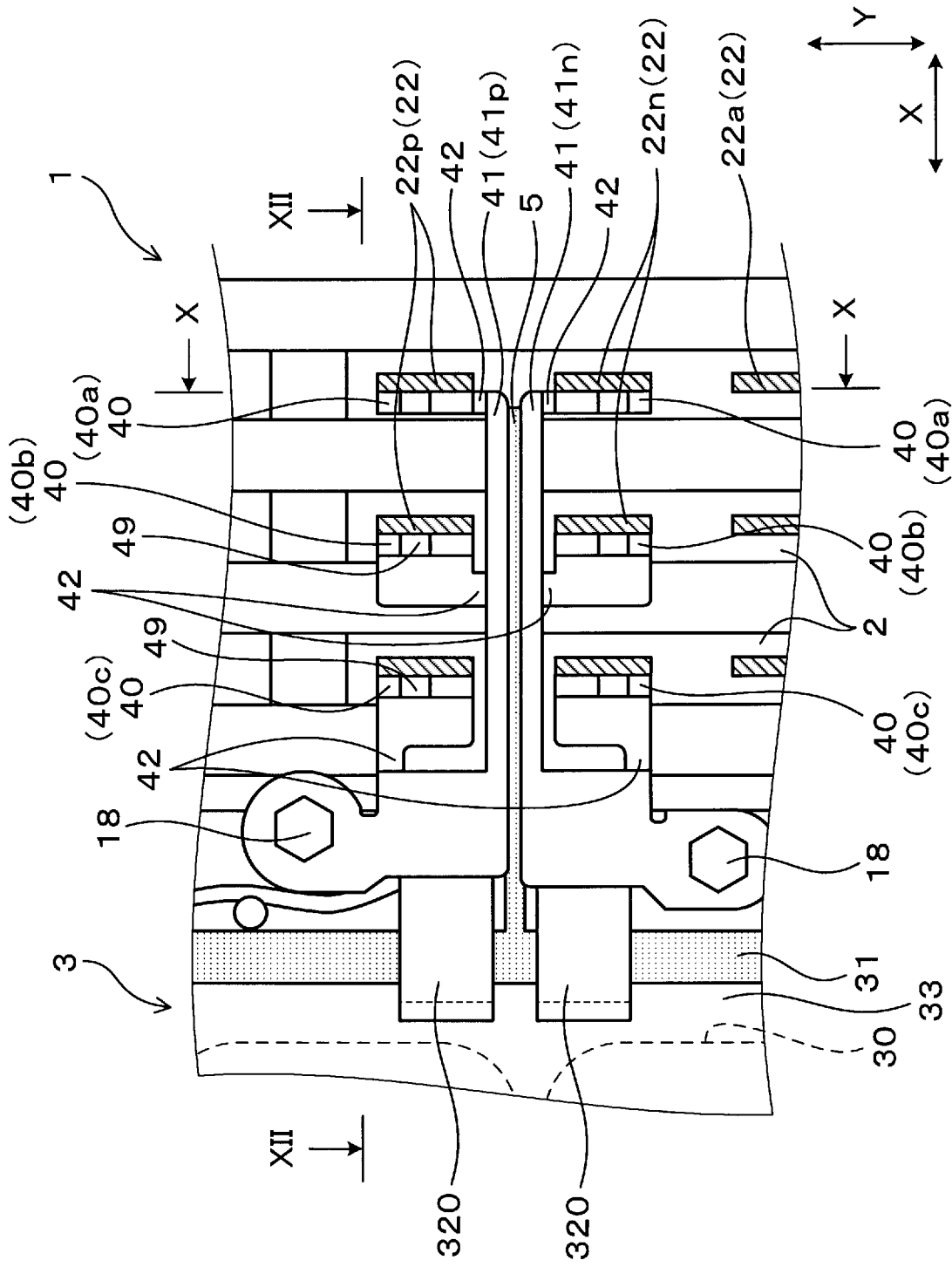
FIG. 4 is an enlarged view of a main part of FIG. 1.
Figure 12:
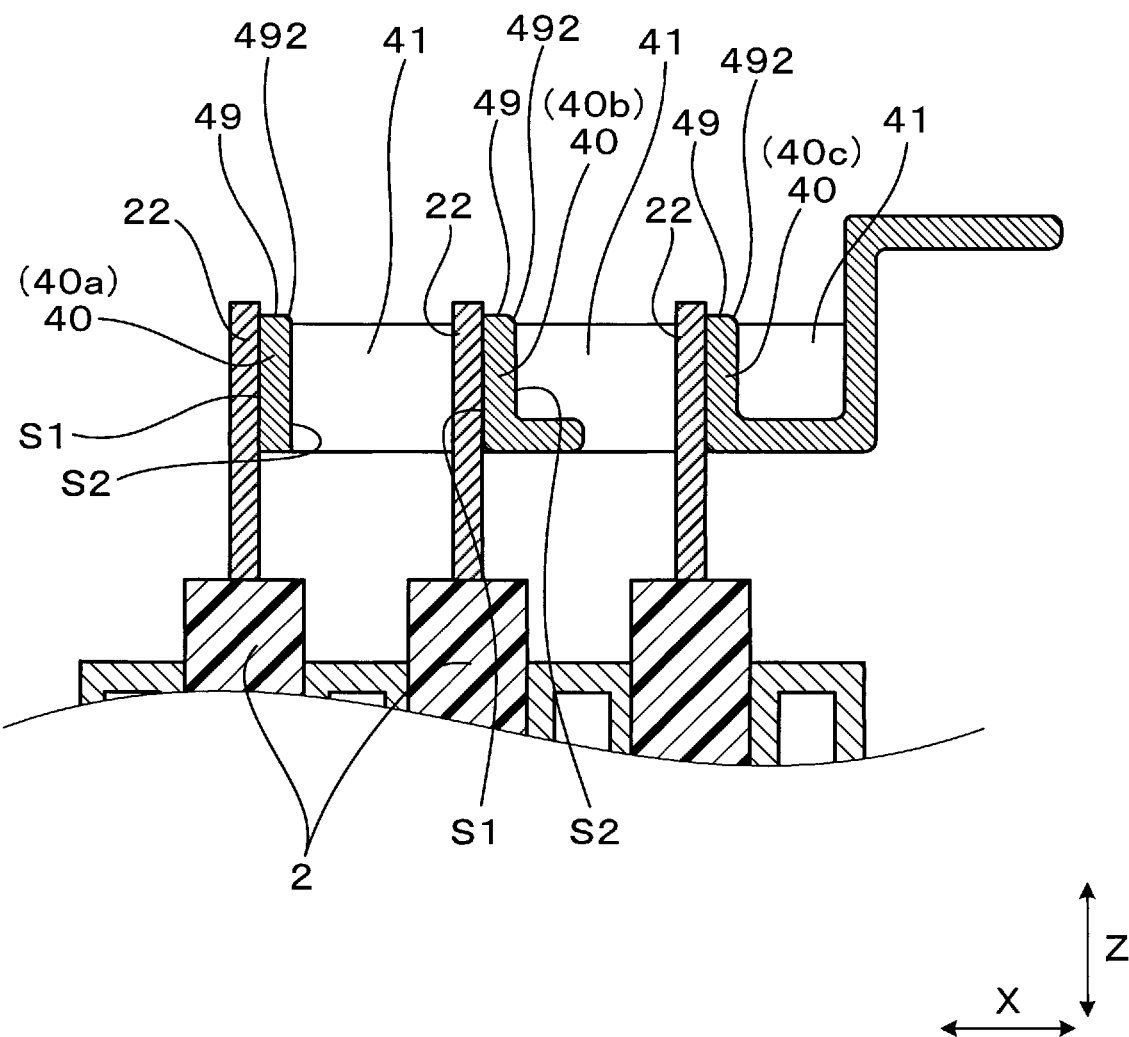
FIG. 12 is a cross-sectional view taken along line XII-XII in FIG. 4 and continued from FIG. 11.

As illustrated in FIG. 4 and FIG. 12, each of the bus bars 4 includes terminal connection portions 40 and a common portion 41. The terminal connection portions 40 are respectively joined and welded to the DC terminals 22p, 22n at a tip surface 49 of each terminal connection portion 40 in a protruding direction of the power terminals 22 (hereinafter also referred to as the Z direction). The common portion 41 is electrically connected to the plurality of terminal connection portions 40. As illustrated in FIG. 3 and FIG. 4, the common portions 41 are arranged between the sets of the plurality of power terminals 22 (in the present embodiment, the set of the cathode terminals 22p and the set of the anode terminals 22n) adjacent to each other in a width direction (hereinafter also referred to as a Y direction) orthogonal to both the Z direction and the X direction. An insulation member 5 is interposed between the pair of common portions 41 (41p, 41n) to insulate the common portions 41 (41p, 41n).

Figure 7:
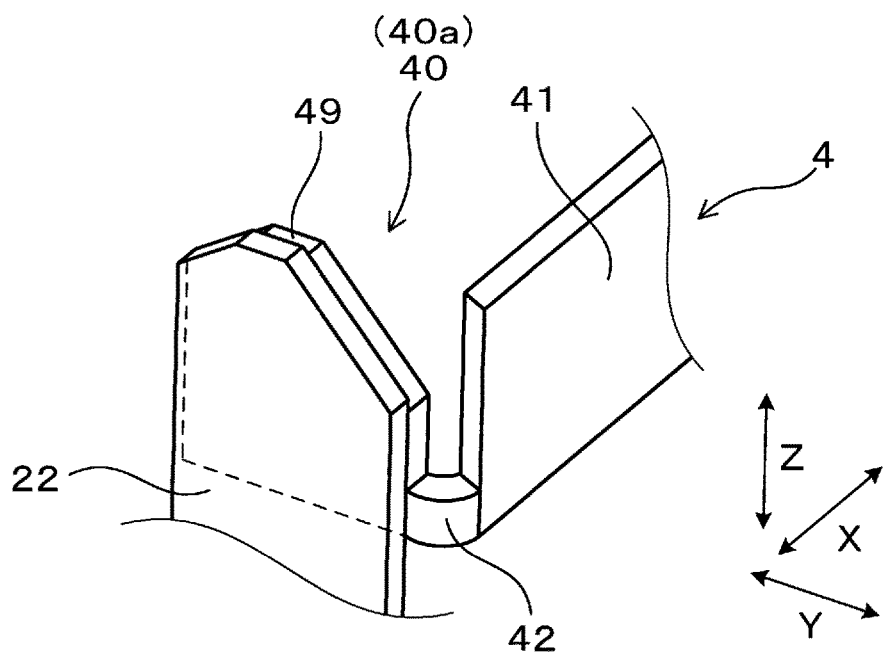
FIG. 7 is an enlarged perspective view of a first terminal connection portion and a DC terminal according to the first embodiment.
Figure 8:
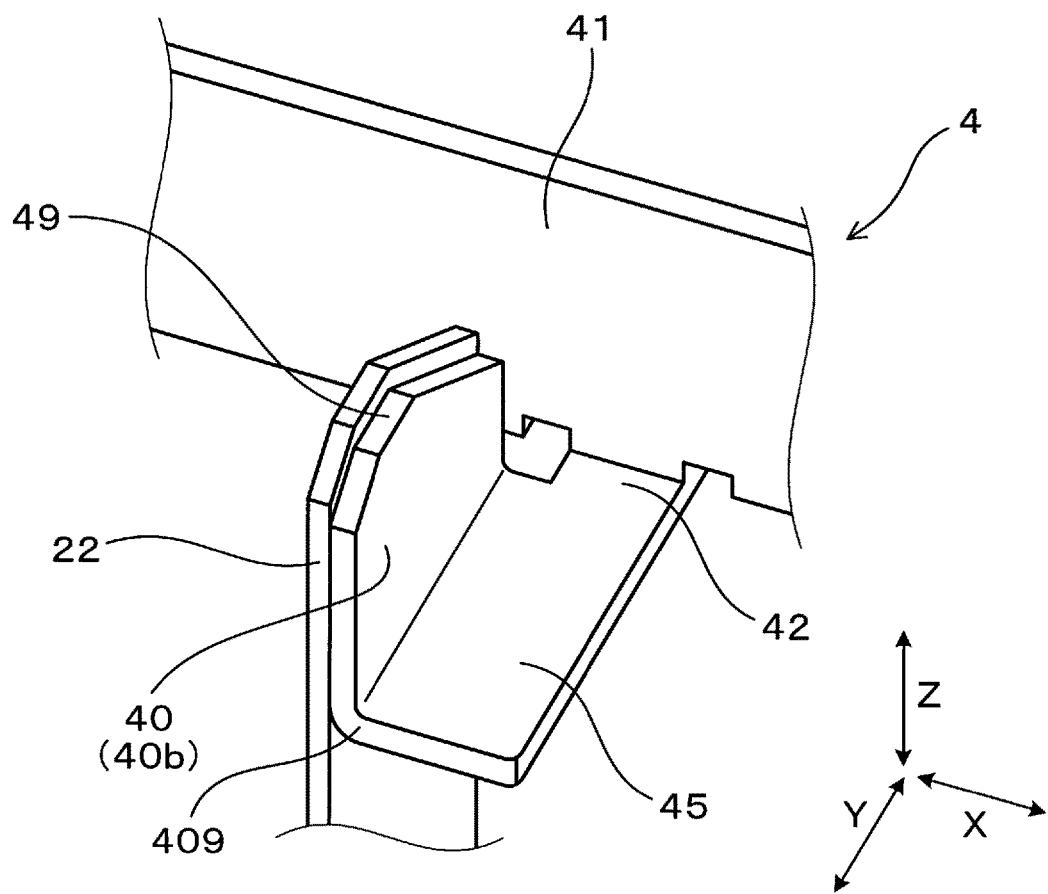
FIG. 8 is an enlarged perspective view of a second terminal connection portion and a DC terminal according to the first embodiment.
Figure 9:
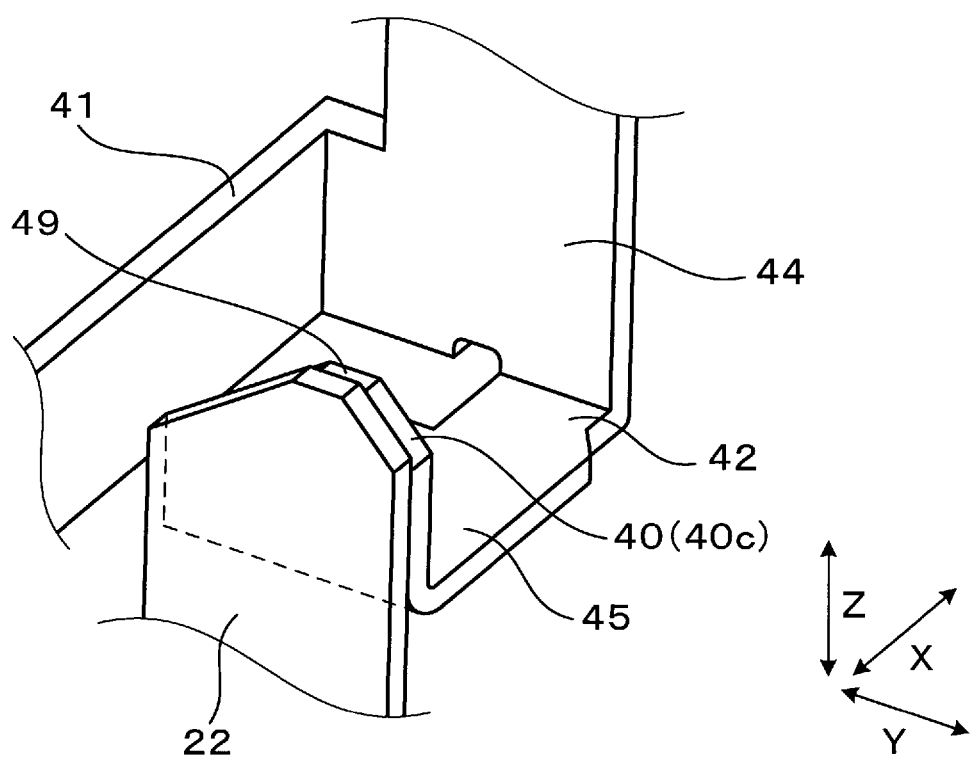
FIG. 9 is an enlarged perspective view of a third terminal connection portion and a DC terminal according to the first embodiment.

As illustrated in FIGS. 7 to 9, each of the bus bars 4 is provided with high-thermal-resistance portions 42. Each of the high-thermal-resistance portions 42 is formed between the corresponding terminal connection portion 40 and the corresponding common portion 41 to electrically connect the terminal connection portion 40 and the common portion 41 together. The high-thermal-resistance portion 42 offers a higher thermal resistance than the terminal connection portion 40. In the present embodiment, the high-thermal-resistance portion 42 has a smaller width than the terminal connection portion 40. This allows the high-thermal-resistance portion 42 to offer a higher thermal resistance than the terminal connection portion 40. The high-thermal-resistance portion 42 offers a higher thermal resistance than the common portion 41.

The power conversion apparatus 1 according to the present embodiment is an in-vehicle power conversion apparatus to be mounted in an electric vehicle or a hybrid vehicle. As illustrated in FIG. 15, each of the semiconductor modules 2 includes two built-in semiconductor devices 20 including an upper-arm semiconductor device 20u and a lower-arm semiconductor device 20d. In the present embodiment, IGBTs are used as the semiconductor devices 20. The DC terminals 22p, 22n of the semiconductor modules 2 are connected to the capacitor 3 via the bus bars 4. The capacitor 3 smooths a DC current applied across the DC terminals 22p, 22n. The power conversion apparatus 1 is also configured to cause each of the semiconductor devices 20 to perform a switching operation to convert DC power from the DC power supply 8 into AC power, thus driving a three-phase AC motor 81. This drives the vehicle.

As illustrated in FIG. 3, a plurality of control terminals 24 protrude from the main body portion 21 of each of the semiconductor modules 2. The control terminals 24 are connected to a control circuit board 19. The control circuit board 19 controls the switching operation of each semiconductor device 20. Furthermore, as described above, each semiconductor modules 2 includes the above-described AC terminal 22a. An AC bus bar not illustrated in the drawings is connected to the AC terminal 22a. The AC terminals 22a are electrically connected to the above-described three-phase AC motor 81 via the AC bus bar.

Figure 2:
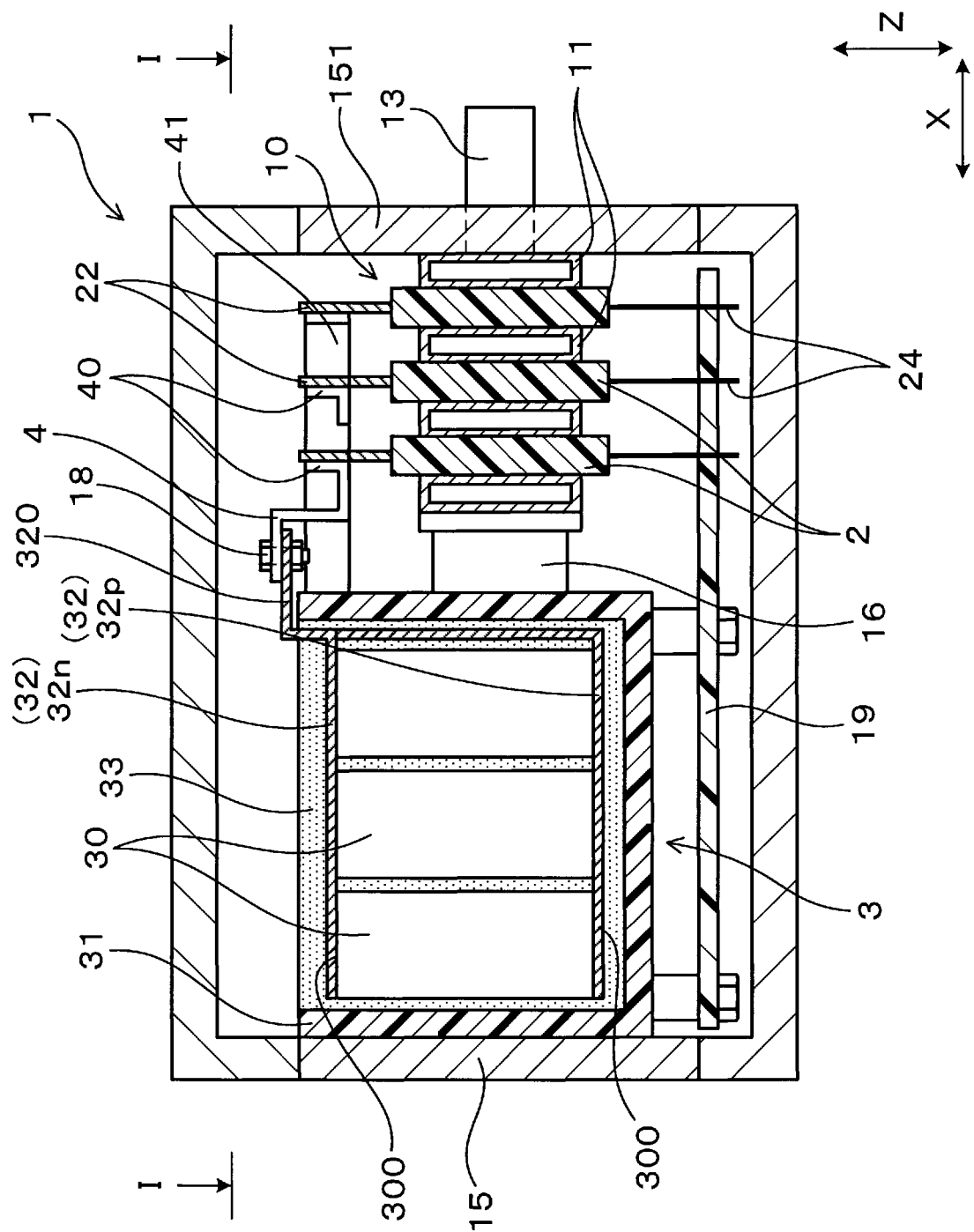
FIG. 2 is a cross-sectional view taken along line II-II in FIG. 1.

As illustrated in FIG. 1 and FIG. 2, in the present embodiment, the plurality of semiconductor modules 2 and a plurality of cooling pipes 11 are stacked to one another to form a stack 10. Furthermore, the capacitor 3 is arranged at a position adjacent to the stack 10 in the X direction. A pressure member 16 (in the present embodiment, a leaf spring) is interposed between the capacitor 3 and the stack 10. The pressure member 16 is used to press the stack 10 toward a wall portion 151 of a case 15. This allows the stack 10 to be fixed in the case 15 while maintaining a contact pressure between each semiconductor module 2 and the corresponding cooling tube 11.

The two cooling pipes 11 adjacent to each other in the X direction are coupled together by connecting pipes 12 at opposite ends of the cooling tubes 11 in the Y direction. An end cooling pipe 11a included in the plurality of cooling pipes 11 and positioned at one end of the cooling pipes 11 in the X direction connects to an introduction pipe 13 through which a refrigerant 17 is introduced and a delivery pipe 14 through which the refrigerant 17 is delivered. When introduced through the introduction pipe 13, the refrigerant 17 flows through all the cooling pipes 11 via the connecting pipes 12 and is then delivered through the delivery pipe 14. This allows the semiconductor modules 2 to be cooled.

Furthermore, as illustrated in FIG. 2, the capacitor 3 includes capacitor elements 30, a capacitor case 31, a sealing member 33, and an electrode plate 32 (32p, 32n). The capacitor elements 30 are sealed in the capacitor case 31 with the sealing member 33. The present embodiment uses film capacitors as the capacitor elements 30. The electrode plate 32 is connected to an electrode surface 300 of the capacitor elements 30. A part of the electrode plate 32 extends out from the capacitor case 31 to form capacitor elements 320. The bus bars 4 are connected to the respective capacitor elements 320. The bus bars 4 are formed separately from the electrode plate 32. The bus bars 4 are fastened to the capacitor elements 320 with fastening members 18.

Figure 14:
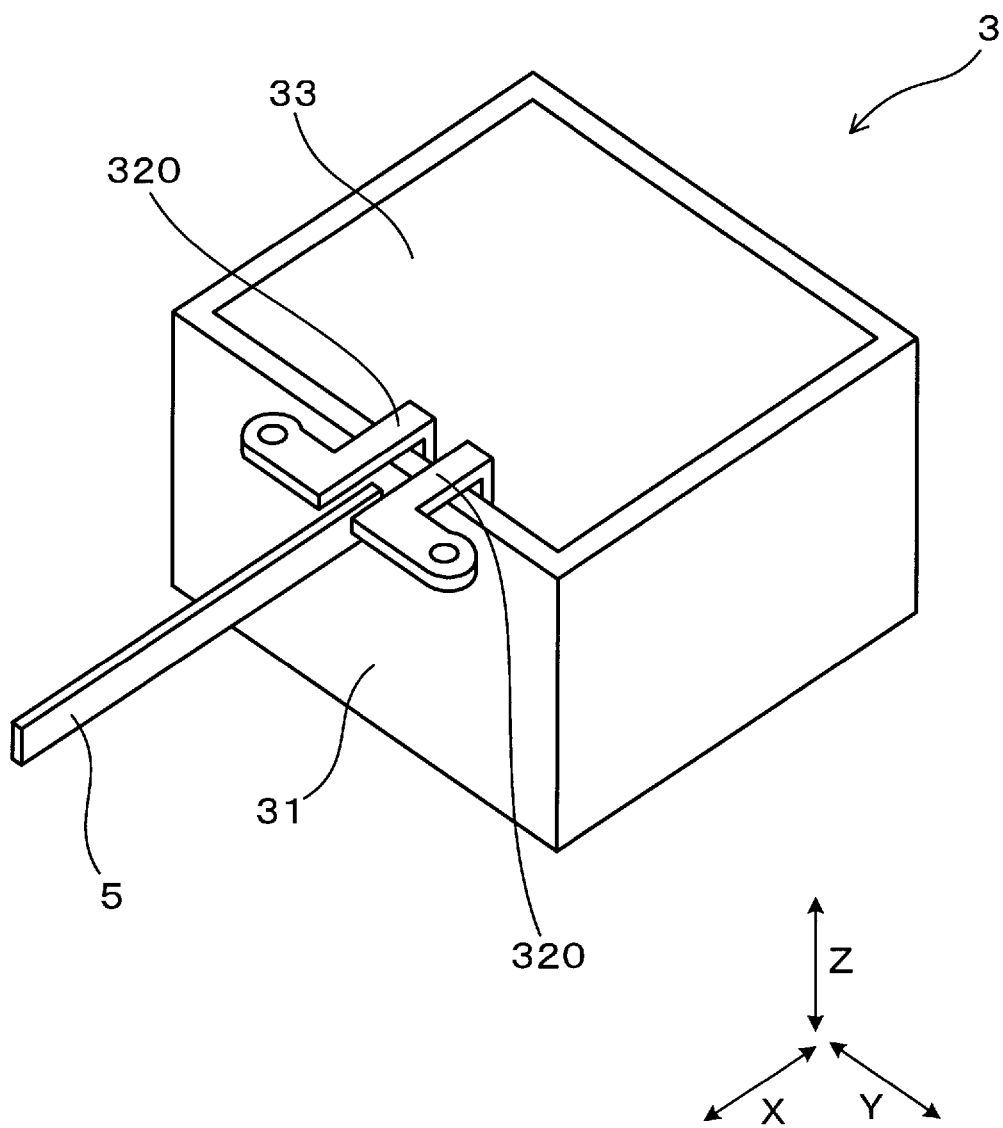
FIG. 14 is a perspective view of a capacitor according to the first embodiment.

Furthermore, as illustrated in FIG. 14, the insulation member 5 extends out from the capacitor case 31. The capacitor case 31 and the insulation member 5 are formed of an insulating resin integrally with each other.

Figure 5:
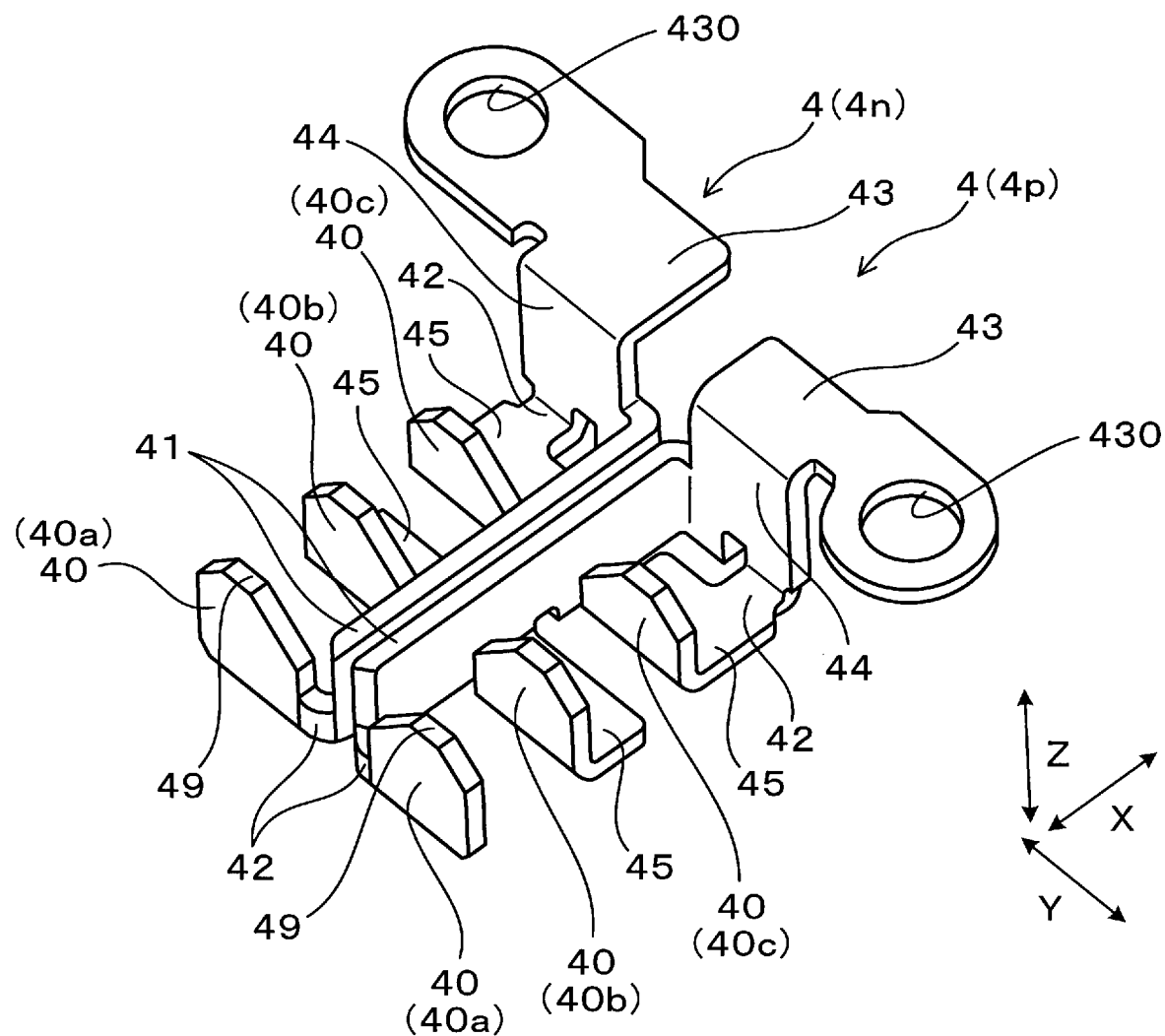
FIG. 5 is a perspective view of bus bars according to the first embodiment.

As illustrated in FIG. 4 and FIG. 5, each bus bar 4 according to the present embodiment includes three terminal connection portions 40 including a first terminal connection portion 40a, a second terminal connection portion 40b, and a third terminal connection portion 40c. The terminal connection portions 40 are respectively welded to the DC terminal 22p or 22n.

As illustrated in FIG. 5, each bus bar 4 is formed of a single metal plate. Each bus bar 4 includes a fastened portion 43 fastened to the capacitor element 320 (see FIG. 14) and an extension portion 44 extending from the fastened portion 43 in the Z direction. The fastened portion 43 is provided with an insertion hole 430 into which the fastening member 18 (see FIG. 4) is inserted. Furthermore, the common portion 41 is connected to the extension portion 44.

Figure 10:
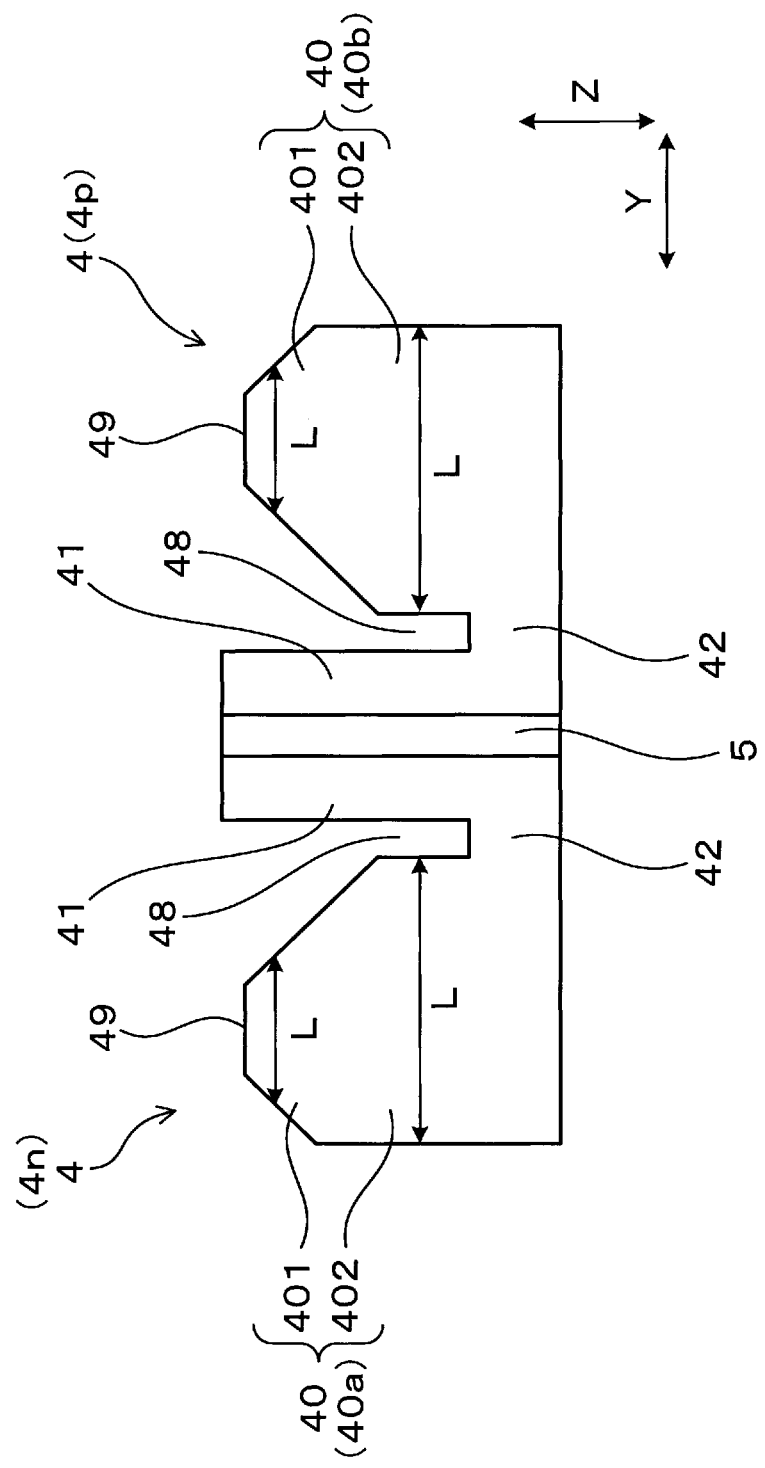
FIG. 10 is a cross-sectional view taken along line X-X in FIG. 4.

As illustrated in FIG. 5 and FIG. 7, the first terminal connection portion 40a is directly connected to the common portion 41 via the high-thermal-resistance portion 42. The first terminal connection portion 40a is welded to the DC terminal 22p or 22n at the tip surface 49. As illustrated in FIG. 10, the first terminal connection portion 40a includes a tapered portion 401 with a Y direction length L increasing from the tip surface 49 toward the high-thermal-resistance portion 42 side in the Z direction and a uniform portion 402 connected to the tapered portion 401 and having a constant Y direction length L. A cutout groove 48 is formed between the uniform portion 402 and the common portion 41.

As illustrated in FIG. 8 and FIG. 9, the second terminal connection portion 40b and the third terminal connection portion 40c are shaped similarly to the first terminal connection portion 40. Furthermore, as illustrated in FIG. 8, a protruding plate portion 45 protrudes from the second terminal connection portion 40b. The protruding plate portion 45 protrudes from an end 409 of the second terminal connection portion 40b located on the high-thermal-resistance portion 42 side in the Z direction, toward the extension portion 44 (see FIG. 5) in the X direction. The second terminal connection portion 40b is electrically connected to the common portion 41 via the protruding plate portion 45 and the high-thermal-resistance portion 42.

Furthermore, as illustrated in FIG. 9, the third terminal connection portion 40c, like the second terminal connection portion 40b, is provided with the protruding plate portion 45. The high-thermal-resistance portion 42 is provided between the protruding plate portion 45 and the extension portion 44. The third terminal connection portion 40c is electrically connected to the common portion 41 via the protruding plate portion 45, the high-thermal-resistance portion 42 and the extension portion 44.

Figure 6:
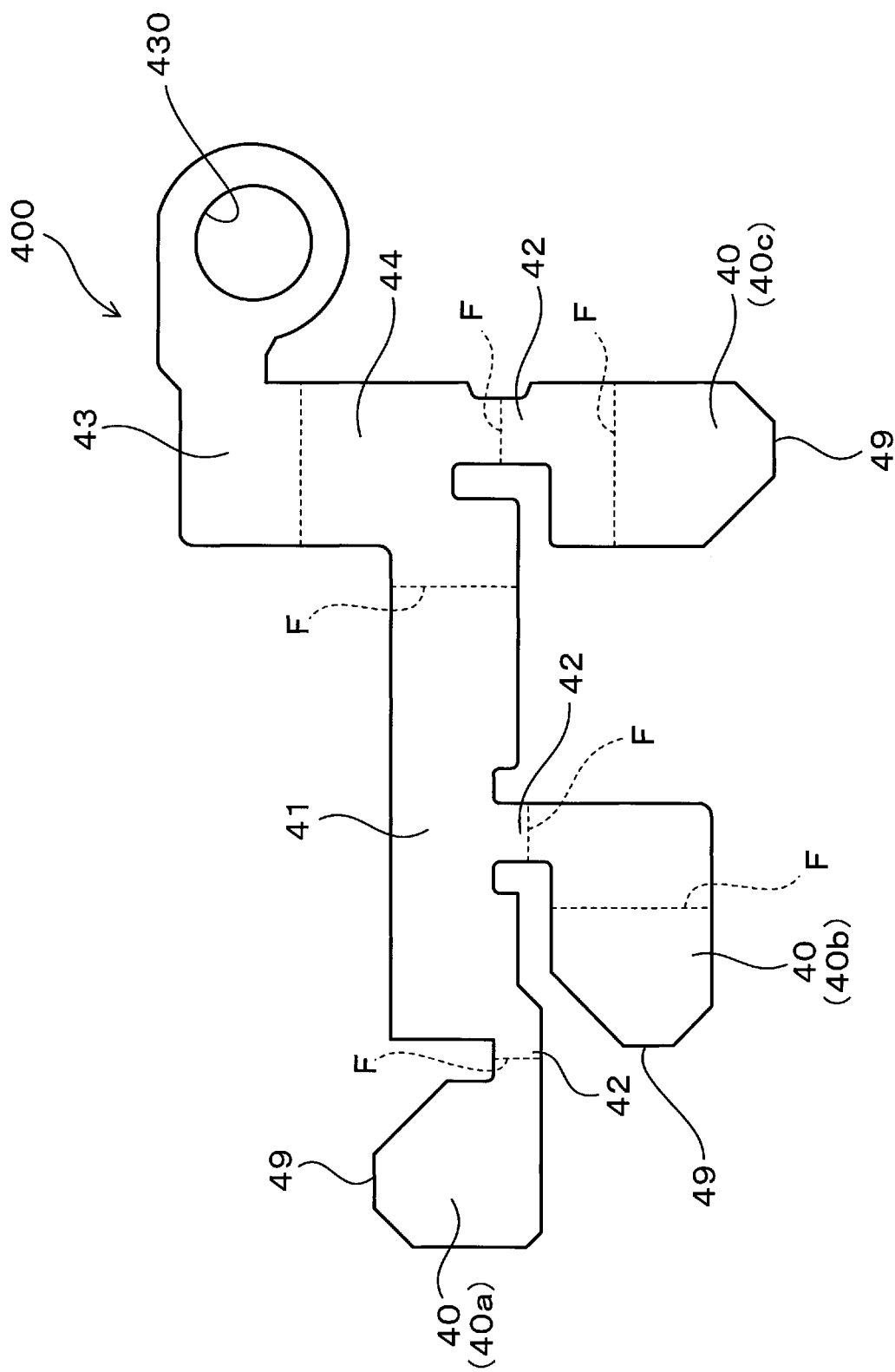
FIG. 6 is a plan view of the unfolded bus bar according to the first embodiment.
Figure 11:
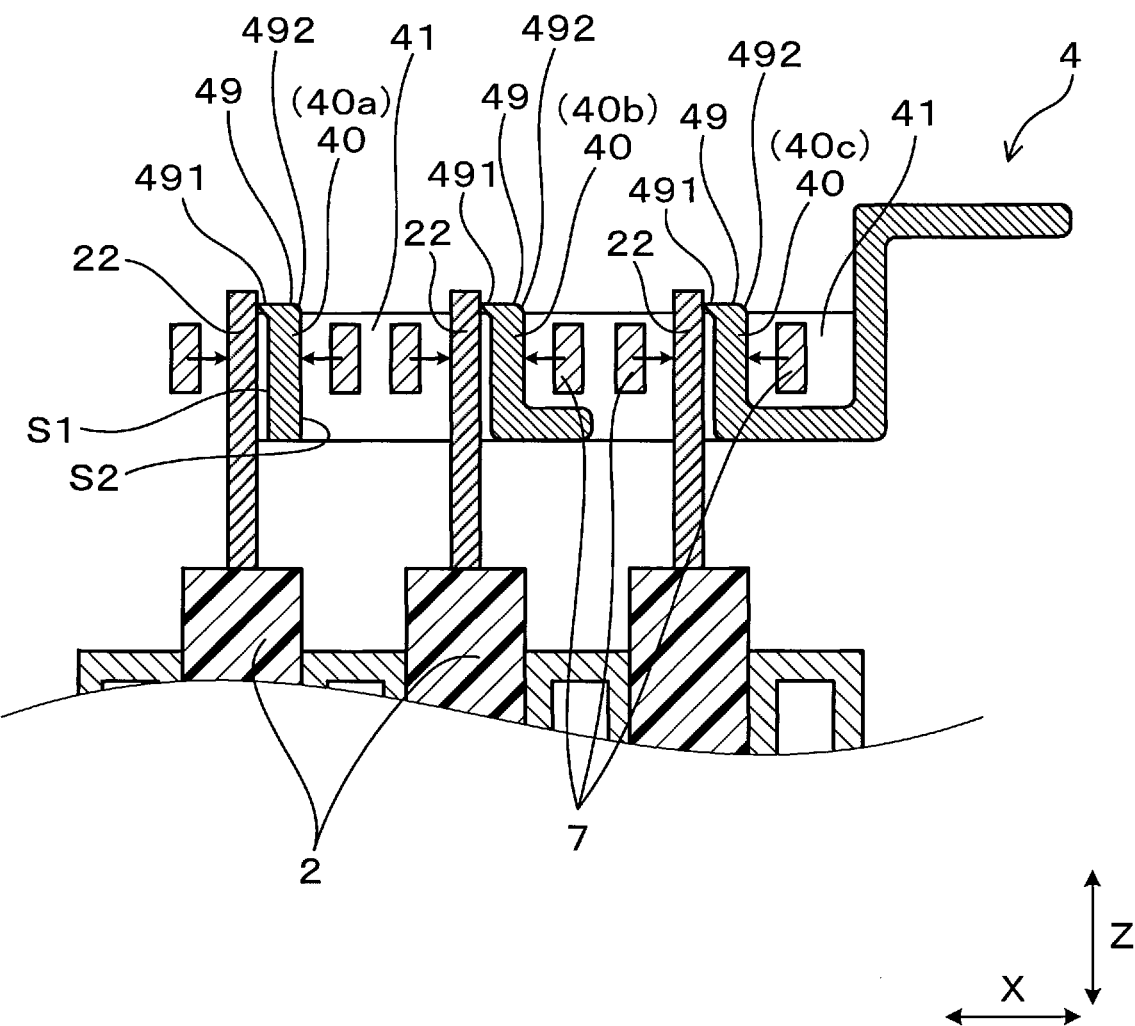
FIG. 11 is a diagram illustrating a manufacturing process for a power conversion apparatus 1 according to the first embodiment.

To form the bus bar 4, first, a metal plate is press-worked into a press-worked plate 400 illustrated in FIG. 6. The press-worked plate 400 is then folded along fold lines F. The bus bar 4 is thus formed (this operation is hereinafter also referred to as the bus bar manufacturing step). The press working results in burrs at edges of the produced press-worked plate 400. As illustrated in FIG. 11, in the present embodiment, when the press-worked plate 400 is folded along the fold lines F to form the bus bar 4, a burr 491 formed at the tip surface 49 of each terminal connection portion 40 is directed toward a contact surface S1 contacting the corresponding DC terminal 22.

To weld the bus bar 4 to the DC terminals 22, first, each DC terminal 22 and the corresponding terminal connection portion 40 are placed adjacent to each other as illustrated in FIG. 11. At this time, the DC terminal 22 is placed on the side toward which the burr 491 is directed. Jigs 7 are subsequently used to press each DC terminal 22 and the corresponding terminal connection portion 40 in the X direction to bring the DC terminal 22 and the terminal connection portion 40 into contact with each other (this operation is hereinafter referred to as a contact step). Then, as illustrated in FIG. 12 and FIG. 13, the tip surface 49 of the terminal connection portion 40 is welded to the DC terminal 22 to form a welded portion 493 (this operation is hereinafter referred to as a welding step).

Figure 13:
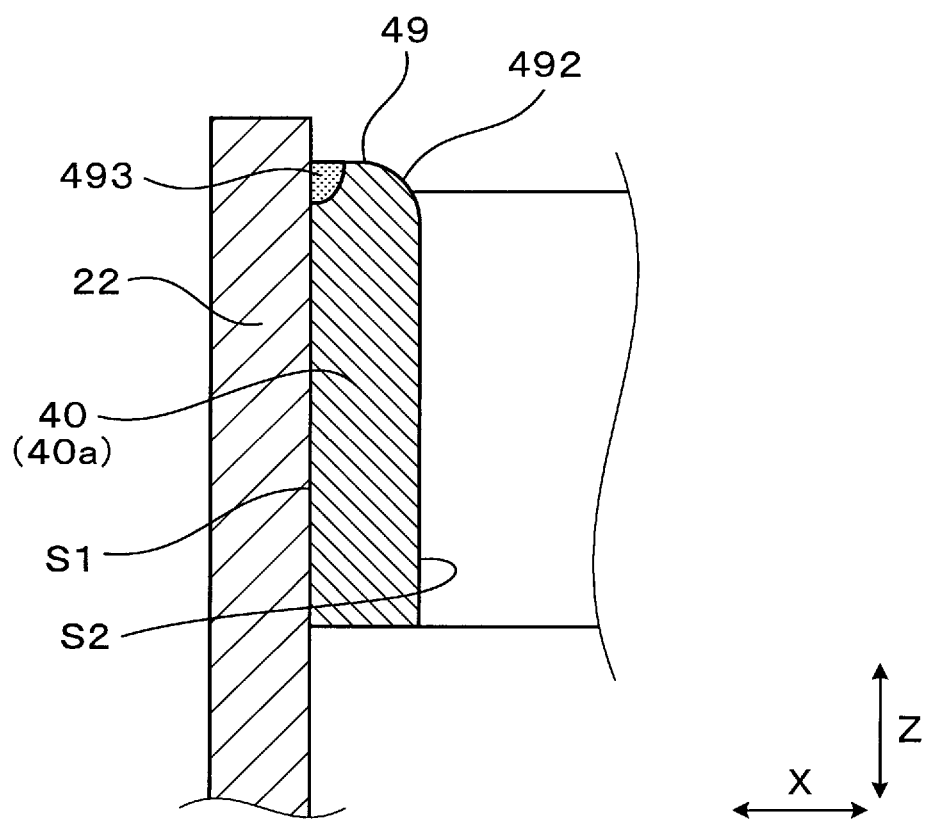
FIG. 13 is an enlarged view of a main part of FIG. 12.

The welding step causes each DC terminal 22 and the corresponding terminal connection portion 40 to be compressed against each other by the jigs 7, thus collapsing the corresponding burr 491 as illustrated in FIG. 13. Furthermore, a sag 492 resulting from the press working remains on a side of the tip surface 49 facing away from the side connected to the DC terminal 22 in the X direction. The contact surface S1 thus has a larger area than a non-contact surface S2.

Advantageous effects of the present embodiment will be described. In the present embodiment, as illustrated in FIGS. 7 to 9, the high-thermal-resistance portion 42 is formed between the terminal connection portion 40 and the common portion 41.

Welding heat resulting from welding of the terminal connection portion 40 to the DC terminal 22 is thus less likely to be transferred from the terminal connection portion 40 to the common portion 41. The welding heat is therefore less likely to be transferred to the insulation member 5, which is thus protected from being degraded. This enables an increase in the insulation level of the pair of bus bars 4p, 4n.

Figure 19:
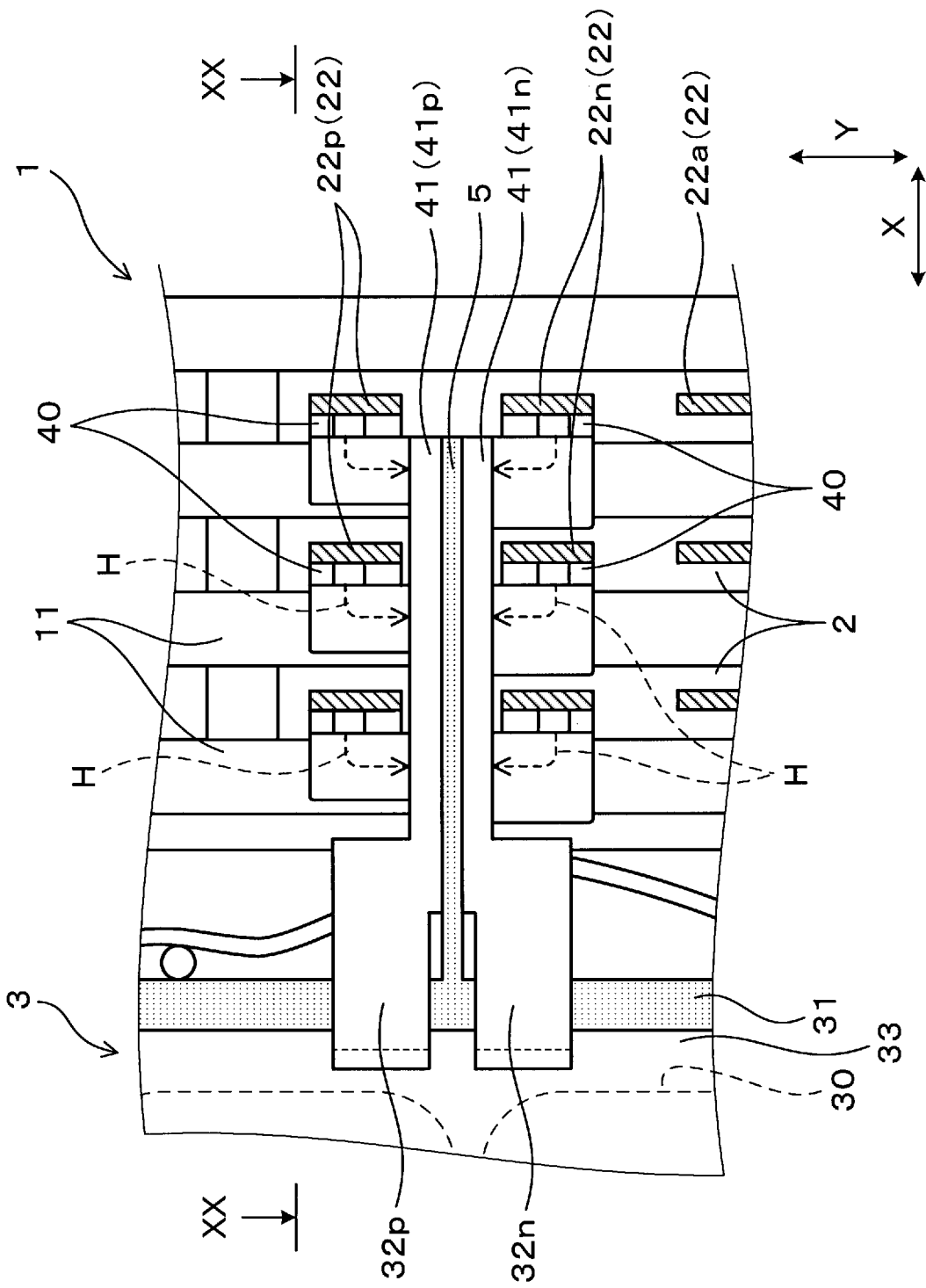
FIG. 19 is a cross-sectional view of a power conversion apparatus in a comparative form.
Figure 20:
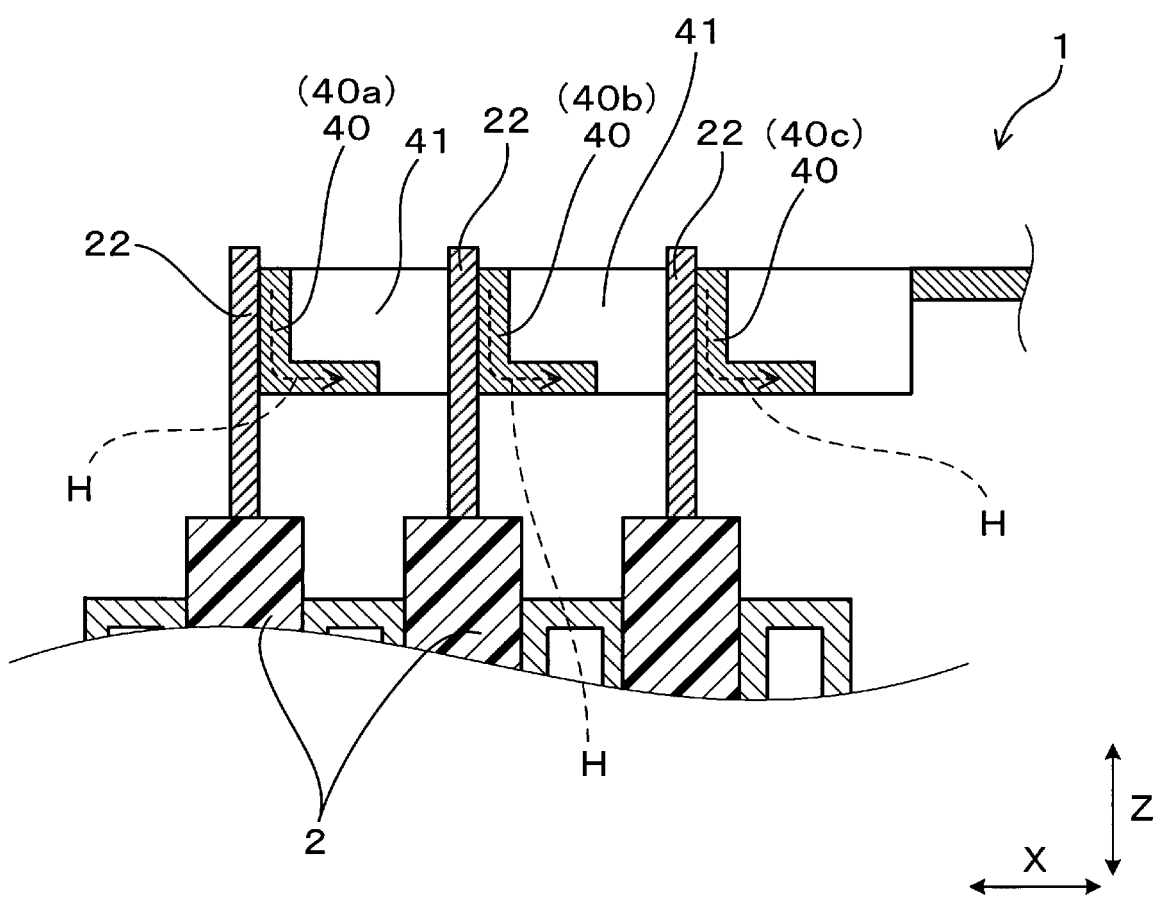
FIG. 20 is a cross-sectional view taken alone line XX-XX in FIG. 19.

That is, if formation of the high-thermal-resistance portion 42 between the terminal connection portion 40 and the common portion 41 is omitted as illustrated in FIG. 19 and FIG. 20, welding heat H is likely to be transferred to the common portion 41. The welding heat H thus degrades the insulation member 5, restraining the level of the insulation between the common portions 41p, 41n from being sufficiently increased. In contrast, the high-thermal-resistance portion 42 formed as in the present embodiment enables the welding heat to be restrained from being transferred to the common portion 41, allowing degradation of the insulation member 5 to be prevented. This enables a sufficient increase in the level of the insulation between the common portions 41p, 41n.

Furthermore, in the present embodiment, the common portions 41 formed in the respective paired bus bars 4p, 4n are arranged between the adjacent sets of the plurality of power terminals 22 (in the present embodiment, the set of the cathode terminals 22p and the set of the anode terminals 22n) as illustrated in FIG. 4. The space between the sets of the plurality of power terminals 22 can thus be effectively utilized as space where the common portions 41 are arranged. This enables a reduction in wasted space and thus in the size of the power conversion apparatus 1.

Furthermore, as illustrated in FIG. 12 and FIG. 13, the sag 492 is formed, as a result of the press working, on the side of each tip surface 49 opposite to the side thereof to which the DC terminal 22 is connected in the X direction. In other words, the tip surface 49 is rounded on the side thereof facing away from the side thereof to which the DC terminal 22 is connected in the X direction.

The terminal connection portion 40 includes two principal surfaces S1, S2, and one of the principal surfaces corresponding to the rounded side of the tip surface 49 (that is, the non-contact surface S2) is likely to have a smaller area than the opposite principal surface (that is, the contact surface S1). The above-described configuration thus allows the principal surface with the larger area (that is, the contact surface S1) to come into contact with the DC terminal 22. This enables a larger current to flow through the terminal connection portion 40. In particular, according to the present embodiment, the bus bar 4 is miniaturized, and thus, the increased contact area between the terminal connection portion 40 and the DC terminal 22 is very effective.

Furthermore, as illustrated in FIGS. 7 to 9, the high-thermal-resistance portion 42 in the present embodiment is formed on the side of the bus bar 4 facing away, in the Z direction, from the side thereof on which the tip surface 49 is formed.

This enables an increase in the distance from the tip surface 49 to the high-thermal-resistance portion 42. The welding heat resulting from welding of the tip surface 49 is therefore likely to be cooled before the heat is transferred to the high-thermal-resistance portion 42. The welding heat is thus less likely to be transferred to the common portion 41, enabling degradation of the insulation member 5 to be mitigated.

Furthermore, of the plurality of terminal connection portions 40 (40a to 40c) arrayed in the X direction, at least one terminal connection portion 40 (in the present embodiment, the first terminal connection portion 40a) is directly coupled to the common portion 41 via the high-thermal-resistance portion 42 as illustrated in FIG. 7.

In other words, the protruding plate portion 45 is omitted from the first terminal connection portion 40a unlike the second terminal connection portion 40b or the third terminal connection portion 40c. The first terminal connection portion 40a has a particularly short transfer distance over which the welding heat travels. The present embodiment is therefore very effective based on the increased thermal resistance between the first terminal connection portion 40a and the common portion 41, leading to less likelihood of transferring the welding heat to the common portion 41.

Furthermore, in the present embodiment, the capacitor case 31 of the capacitor 3 is formed integrally with the insulation member 5 as illustrated in FIG. 14.

The present embodiment thus eliminates a need for the dedicated insulation member 5, enabling a reduction in the number of components of the power conversion apparatus 1. This in turn enables a reduction in manufacturing costs of the power conversion apparatus 1.

Furthermore, in the present embodiment, each capacitor terminal 320 and the corresponding bus bar 4 are separately provided and fastened to each other using the fastening member 18 as illustrated in FIG. 2.

This enables maintainability of the power conversion apparatus 1 to be enhanced. That is, even if any semiconductor module 2 fails, the fastening member 18 may be removed and the semiconductor module 2, along with the corresponding bus bar 4, may be replaced. This eliminates a need for replacement of the capacitor 3 that has not failed.

The above-described configuration also allows the capacitor 3 to be easily used for general purposes. That is, when a new power conversion apparatus 1 is to be developed, the shape or number of semiconductor modules 2 may exclusively be changed without any change in the capacitor 3. In this case, the capacitor 3 may be commonly used by changing the shape of the bus bar 4 connected to the semiconductor modules 2. This allows the capacitor 3 to be used for more general purposes.

Furthermore, the manufacturing method for the power conversion apparatus 1 according to the present embodiment includes the bus bar manufacturing step, the contact step, and the welding step. In the bus bar manufacturing step (see FIG. 5 and FIG. 6), a metal plate is press-worked, and is further folded at areas corresponding to the high-thermal-resistance portions 42. This allows manufacturing of the bus bars 4 each including the terminal connection portions 40 each with the burr 491 protruding toward the contact surface S1 contacting the corresponding DC terminal 22p or 22n in the X direction.

In the present embodiment, the high-thermal-resistance portion 42 has a reduced width, and thus, in the bus bar manufacturing step, the metal plate can be easily folded at the areas corresponding to the high-thermal-resistance portions 42. This allows the bus bars 4 to be easily manufactured.

Furthermore, in the contact step (see FIG. 11 and FIG. 12), each contact surface S1 is brought into contact with the corresponding DC terminal 22p or 22n. In the welding step (see FIG. 13), each terminal connection portion is welded to the corresponding DC terminal.

This allows the surface of the terminal connection portion 40 on which the burr 491 is formed (that is, the contact surface S1) to be brought into contact with and welded to the corresponding DC terminal 22p or 22n. The surface with the larger area (that is, the contact surface S1) can thus be brought into contact with the DC terminal 22p or 22n, enabling a large current to flow through the corresponding terminal connection portion 40.

As described above, the present embodiment is capable of providing a power conversion apparatus that may be miniaturized and that enables an increase in the insulation level of the pair of bus bars, and also providing the manufacturing method for the power conversion apparatus.

In the present embodiment, the high-thermal-resistance portion 42 has a smaller width and offers a higher thermal resistance, than the terminal connection portion 40. However, the present disclosure is not limited to this. For example, the high-thermal-resistance portion 42 may have a larger thickness than the terminal connection portion 40. The high-thermal-resistance portion 42 may also be formed of a metal material offering a higher thermal resistance than the terminal connection portion 40.

In the following embodiments, those of the reference numerals used in the drawings which are the same as the reference numerals used in the first embodiment denote, for example, components similar to the components of the first embodiment, unless otherwise specified.

(Second Embodiment)

Figure 16:
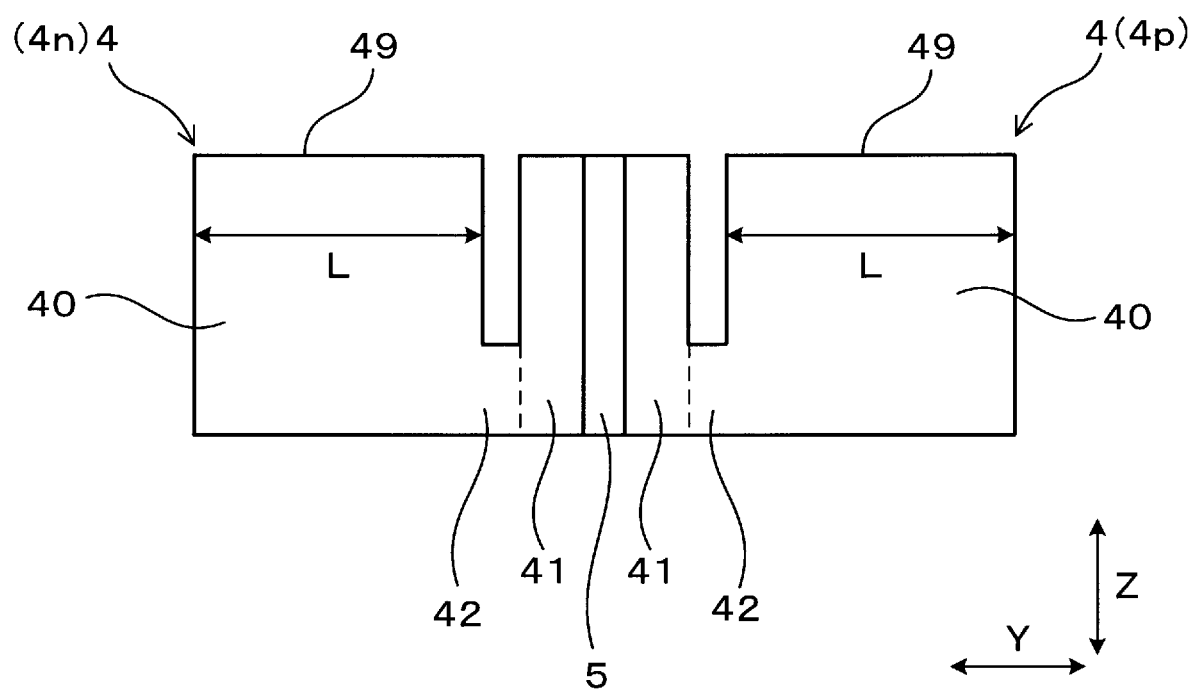
FIG. 16 is a side view of a first terminal connection portion and an insulation portion according to a second embodiment.

The present embodiment is an example in which the shape of the terminal connection portion 40 is modified. As illustrated in FIG. 16, in the present embodiment, the terminal connection portion 40 is not provided with the tapered portion 401 (see FIG. 10). The terminal connection portion 40 according to the present embodiment is formed such that all the Y direction lengths from the tip surface 49 in the Z direction are constant.

The second embodiment otherwise has a configuration and effects similar to those of the first embodiment.

(Third Embodiment)

Figure 17:
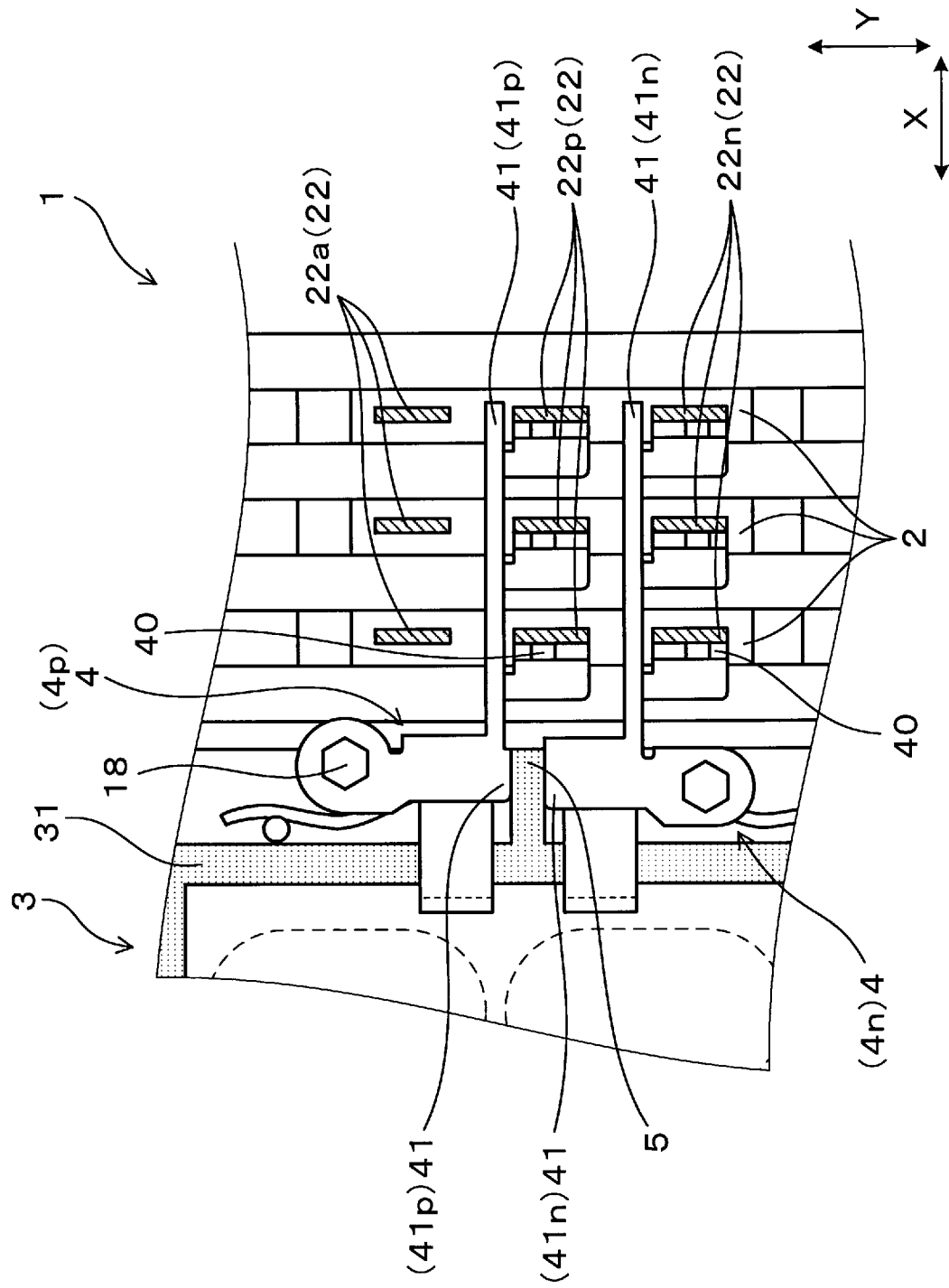
FIG. 17 is a cross-sectional view of a power conversion apparatus according to a third embodiment.

The present embodiment is an example in which the installation position of the bus bars 4 is changed. As illustrated in FIG. 17, in the present embodiment, a common portion 41p of a cathode bus bar 4p is arranged between the set of the AC terminals 22a and the set of the cathode terminal 22p in the Y direction. A part of a common portion 41n of an anode bus bar 4n is also arranged between the set of the cathode terminals 22p and the set of the anode terminals 22n in the Y direction. Furthermore, in the present embodiment, the insulation member 5 is provided between the pair of common portions 41p, 41n as is the case with the first embodiment. The insulation member 5 is formed integrally with the capacitor case 31.

The third embodiment otherwise has a configuration and effects similar to those of the first embodiment.

(Fourth Embodiment)

Figure 18:
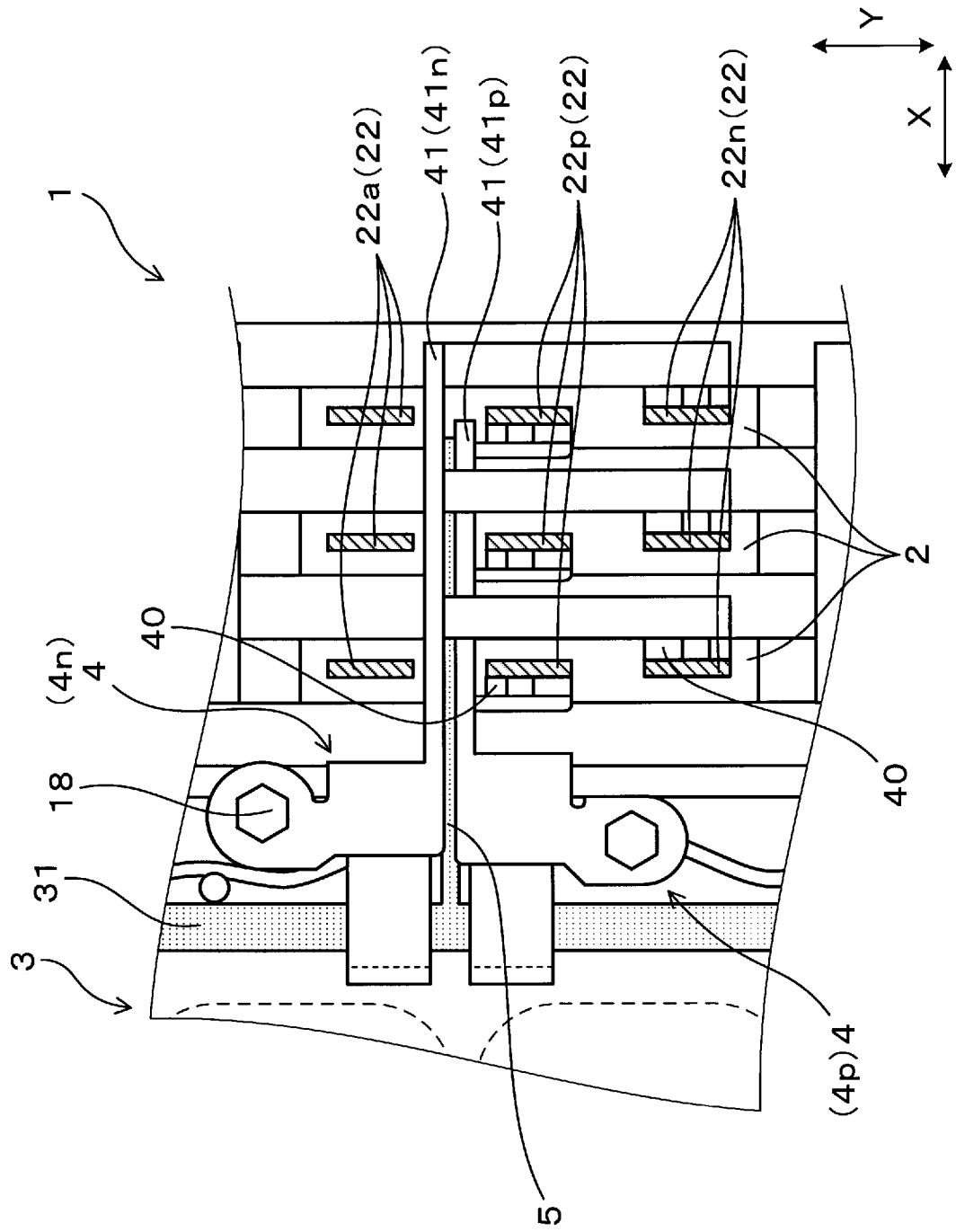
FIG. 18 is a cross-sectional view of a power conversion apparatus according to a fourth embodiment.

The present embodiment is an example in which the installation position of the bus bars 4 is changed. As illustrated in FIG. 18, in the present embodiment, the common portions 41p, 41n of the pair of bus bars 4p, 4n are arranged between the set of the AC terminals 22a and the set of the cathode terminals 22p in the Y direction. Furthermore, in the present embodiment, the insulation member 5 is provided between the pair of common portions 41p, 41n as is the case with the first embodiment. The insulation member 5 is formed integrally with the capacitor case 31.

The third embodiment otherwise has a configuration and effects similar to those of the first embodiment.

The present disclosure has been described in compliance with the embodiments, but it should be comprehended that the present disclosure is not limited to the embodiments or the structures thereof. The present disclosure also embraces various modifications and variations of equivalents. The category and scope of the present disclosure also include various combinations and forms of the embodiments, and other combinations and forms including only one additional element, one or more additional elements, or one or less additional element.

The invention claimed is:

1. A power conversion apparatus including a plurality of semiconductor modules each including a main body portion with a built-in semiconductor device and a power terminal protruding from the main body portion;
   a capacitor smoothing a DC voltage; and
   a pair of bus bars, wherein the power terminals include a pair of DC terminals electrically connected to the capacitor via the bus bars and an AC terminal electrically connected to an AC load, the plurality of semiconductor modules are arrayed in a thickness direction of the power terminals, each of the bus bars includes terminal connection portions joined and welded to the respective DC terminals and a common portion electrically connected to the terminal connection portions, the common portions are arranged between sets of the power terminals adjacent to each other in a width direction orthogonal to a protruding direction and the thickness direction of the power terminals, and an insulation member is interposed between the common portions to insulate the common portions from each other, and each of the bus bars includes high-thermal-resistance portions each formed between the corresponding terminal connection portion and the corresponding common portion to electrically connect the terminal connection portion and the common portion together, the high-thermal-resistance portion offering a higher thermal resistance than the terminal connection portion.

2. The power conversion apparatus according to claim 1, wherein a tip surface of each of the terminal connection portions in the protruding direction is rounded on a side of the tip surface facing away, in the thickness direction, from a side connected to the corresponding DC terminal.

3. The power conversion apparatus according to claim 1, wherein at least one of the terminal connection portions arrayed in the thickness direction is directly connected to the corresponding common portion via the corresponding high-thermal-resistance portion.

4. The power conversion apparatus according to claim 1, wherein the capacitor includes a capacitor element and a capacitor case housing the capacitor element, and the capacitor case and the insulation member are formed integrally with each other.

5. A manufacturing method for the power conversion apparatus according to claim 1, the method comprising:

a bus bar manufacturing step of press-working a metal plate and further folding the metal plate at areas thereof corresponding to the high-thermal-resistance portions, to manufacture the bus bars each including the terminal connection portions each with a burr protruding toward a contact surface contacting the corresponding DC terminal in the thickness direction;

a contact step of bringing the contact surface of each terminal connection potion into contact with the corresponding DC terminal; and a welding step of welding the terminal connection portion to the DC terminal.

* * * * *